United States Patent Office 2,915,897
Patented Dec. 8, 1959

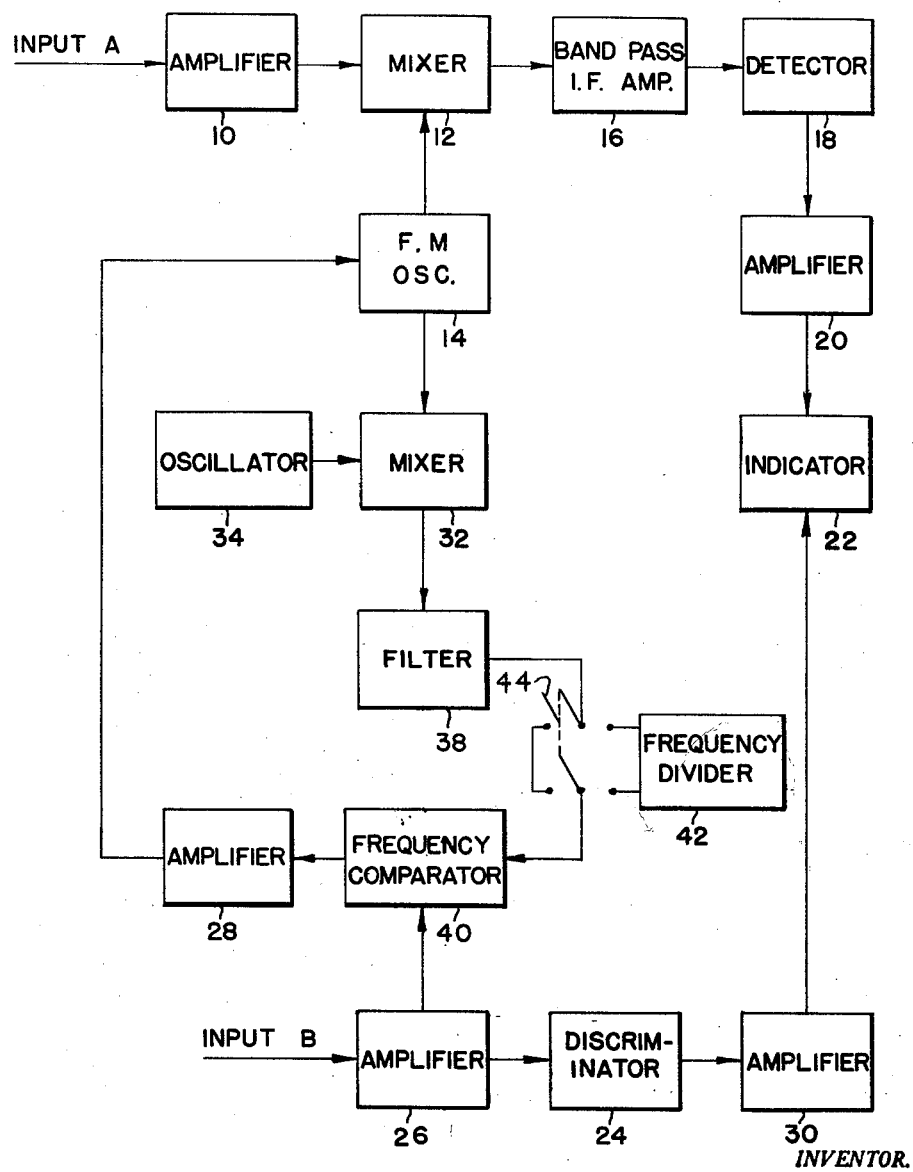

2,915,897

AUTOMATIC TRACKING SPECTRUM ANALYZER

Richard R. Hoffmann, Flushing, N.Y., assignor to Probescope Co., Long Island City, N.Y.

Application May 7, 1956, Serial No. 582,989

8 Claims. (Cl. 73—71.4)

This invention relates to automatic tracking frequency analyzers.

It is the purpose of the apparatus disclosed hereinafter to automatically select a desired signal component in the presence of noise and other undesired signal components. The undesired signals present may or may not be harmonically related to the desired component. Variations in magnitude and frequency of the desired component may be recorded or visually displayed on conventional display devices.

One of the many applications of this type of analyzer is in the field of vibration analysis. One example is the analysis of a high speed blower in which the component of interest is equal in frequency to the rotational speed.

The analyzer is provided with two input connections. The first of these, referred to hereinafter as "Input A," is provided with a complex wave a component of which is the desired signal. The second input, referred to hereinafter as "Input B," is provided with a signal voltage derived from the equipment under test and is an indication of the fundamental frequency of the complex waveform, which in this example is the rotational frequency of the blower.

The two signal inputs are provided with signal voltages obtained from two transducers mounted on the blower. Transducer A, connected to Input A, is mounted on some member of the blower in which the vibrational resonances are of considerable importance. Transducer B, connected to Input B, is mounted near the rotating shaft. Transducer B normally provides a voltage having a waveform approximating a sinusoid at the frequency of rotation.

The signal to be studied is filtered out, amplified, detected, and applied through suitable means to the indicator so as to obtain a deflection in one axis. If an oscilloscope is employed this signal may be applied to the "Y-axis" deflection plates.

In like manner the reference frequency signal connected at Input B is amplified and fed through a discriminator to provide a D.C. output voltage which is proportional to the reference frequency, and by means of a deflection amplifier to cause a deflection of the "X-axis" of the oscilloscope or other recording means.

Accordingly, it is an object of this invention to provide an automatic tracking spectrum analyzer.

It is a further object of this invention to detect a desired signal in the presence of a second signal of like frequency.

It is a particular object of this invention to provide a frequency analyzer having means to analyze harmonic components of a selected frequency.

It is still a different object to provide a drift free analyzer.

A still further object is to provide an automatic tracking analyzer free from effects of thermal drift of oscillators or instability in automatic frequency control circuits.

Still other objects and advantages will be pointed out with particularity and still others will become apparent as the following description proceeds, taken in conjunction with the accompanying drawings wherein like numerals refer to like elements.

Figure 3 discloses, in schematic form, the preferred embodiment of this invention.

Figure 4:
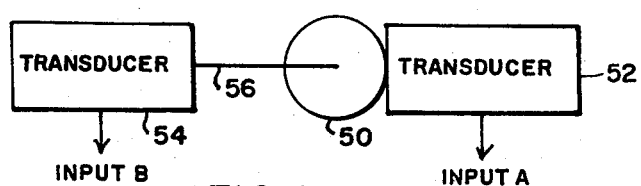

Figure 4 shows a rotating machine such as a blower, with a pair of transducers positioned to provide input signals to the apparatus of Figure 3.

The complex wave of which the desired signal is a component, is introduced at Input A and is amplified linearly by the input amplifier 10. This input signal band of (200 c.p.s. to 2400 c.p.s.) is translated upwards in frequency in the mixer 12 by conversion with the output signal of local oscillator 14. That portion of the band which falls at the I.F. frequency (5,000 c.p.s.) is passed by the selective I.F. amplifier 16, which serves as a filter, thereby excluding all other components.

The amplitude of the signal passed by the I.F. amplifier 16 is measured by the detector 18, amplified by the deflection amplifier 20 and appears as a deflection along the Y-axis of the recorder 22.

It is desired, however, to select only one signal from among all of those present, that is the reference frequency. This may be accomplished by setting the oscillator 14 so that the difference frequency between the output of oscillator 14 and the output of I.F. amplifier 16 is equal to the reference frequency. That is:

$$f_h = f_i + f_r$$

where $f_h$ is the oscillator frequency
$f_i$ is the I.F. frequency
$f_r$ is the reference frequency In order to fulfill the purpose of this equipment the local oscillator 14 must automatically maintain the relationship given above, as the reference frequency is made to vary through a given range of frequencies, in this case 200 c.p.s. to 2400 c.p.s.

One method of maintaining the necessary tracking between the local oscillator frequency and the reference frequency is to employ the frequency dependent voltage provided by the discriminator 24, to which is applied the Input B signal which may be amplified by amplifier 26. As the reference frequency is varied, the varying D.C. output of the discriminator 24 is amplified linearly by an automatic frequency control amplifier 28 and causes the frequency modulated oscillator 14 to shift in frequency. The linearity and sensitivity of the oscillator 14 may be adjusted so that proper tracking is maintained.

If, however, consideration is given to the acceptance bandwidth of the I.F. amplifier 16, which may be in the order of 20 c.p.s., it will be appreciated that any slight deviation from the desired oscillator frequency will cause the desired response to fall on the skirts of the I.F. response curve resulting in an erroneous amplitude reading. Such a deviation of the local oscillator frequency may be caused by only slight non-linearity of the oscillator frequency to A.F.C. voltage relationship, thermal drift of the oscillator and A.F.C. amplifier and instability in the A.F.C. amplifier or discriminator.

It is to be noted, however, that this system is suitable for applications wherein the required I.F. bandwidth is broad as compared to the oscillator deviation.

Figure 2:
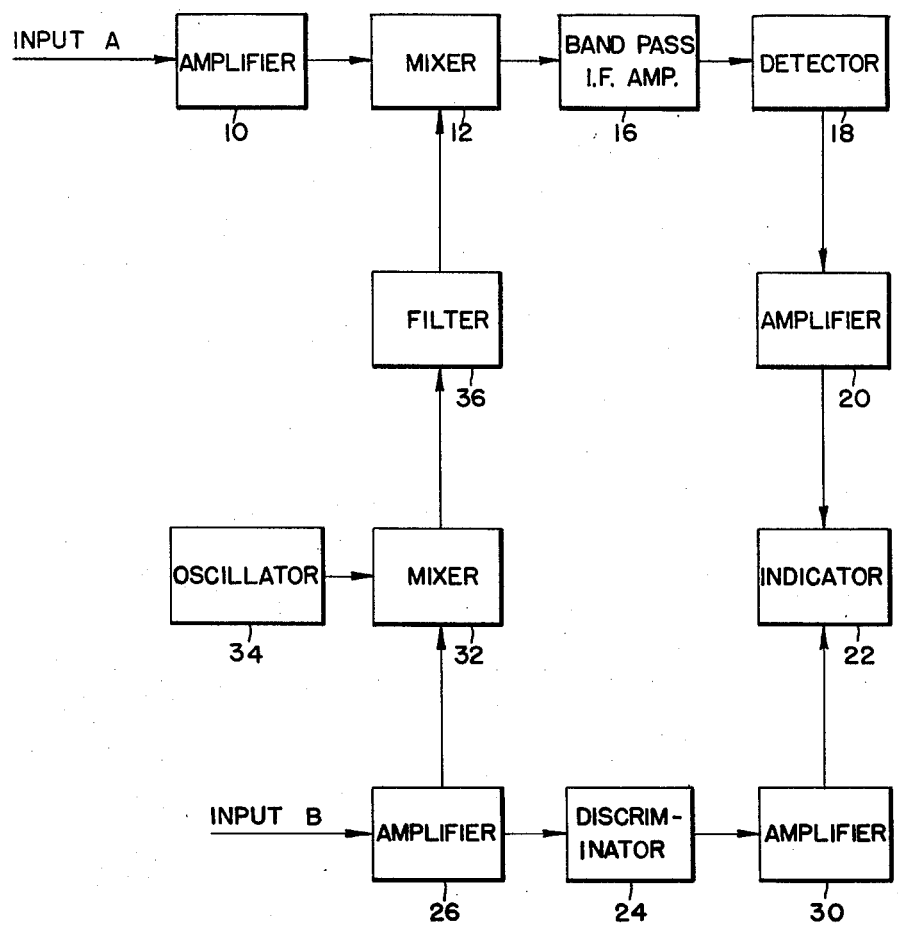
Figure 2 shows an alternative embodiment of the device of this invention in schematic form.

Therefore, there is disclosed in Figure 2 a further improved system wherein direct use is made of the reference signal ($f_r$). This signal, which appears at Input B, is amplified linearly in the input amplifier 26 and is then translated upwards in frequency in the mixer 32 by beating it with the output of crystal oscillator 34.

The frequency of the crystal oscillator 34 is identical to the center frequency of the I.F. amplifier, which serves as a filter. A pair of sidebands will be found at the output of the mixer 32. These are:

$$f_i + f_r$$

and $$f_i - f_r$$

where $f_i$ is the crystal oscillator frequency. If the lower sideband is suppressed by the filter 36, which is designed to pass the band 5200 to 7400 c.p.s., the only component appearing at the mixer 12 will then be:

$$f_i + f_r$$

which may be considered as a local oscillator frequency. Therefore:

$$f_h = f_i + f_r$$

which meets the original requirements.

Since the overall system is to function over a range exceeding one octave it is possible for harmonic components of the reference signal to appear at the mixer 32. These harmonics will produce sidebands as did the fundamental and then appear at the mixer 12 as additional local oscillator signal components $$f_h = (f_i + f_r), (f_i + 2f_r), (f_i + 3f_r), \ldots$$

As was mentioned earlier the complex wave appearing at Input A consisted of a fundamental component of the reference frequency, harmonics of this component and other undesirable signals. These harmonically related components will heterodyne with their respective local oscillator sidebands and appear at the I.F. frequency. Since all of these components appear in the I.F. amplifier 16 simultaneously the desired amplitude reading is completely obscured.

It should be noted that this method is applicable where the range of frequencies to be studied is limited to one octave or less. In this case the harmonics of the reference frequency will fall outside the operating range and may be eliminated by proper filtering.

Figure 1:
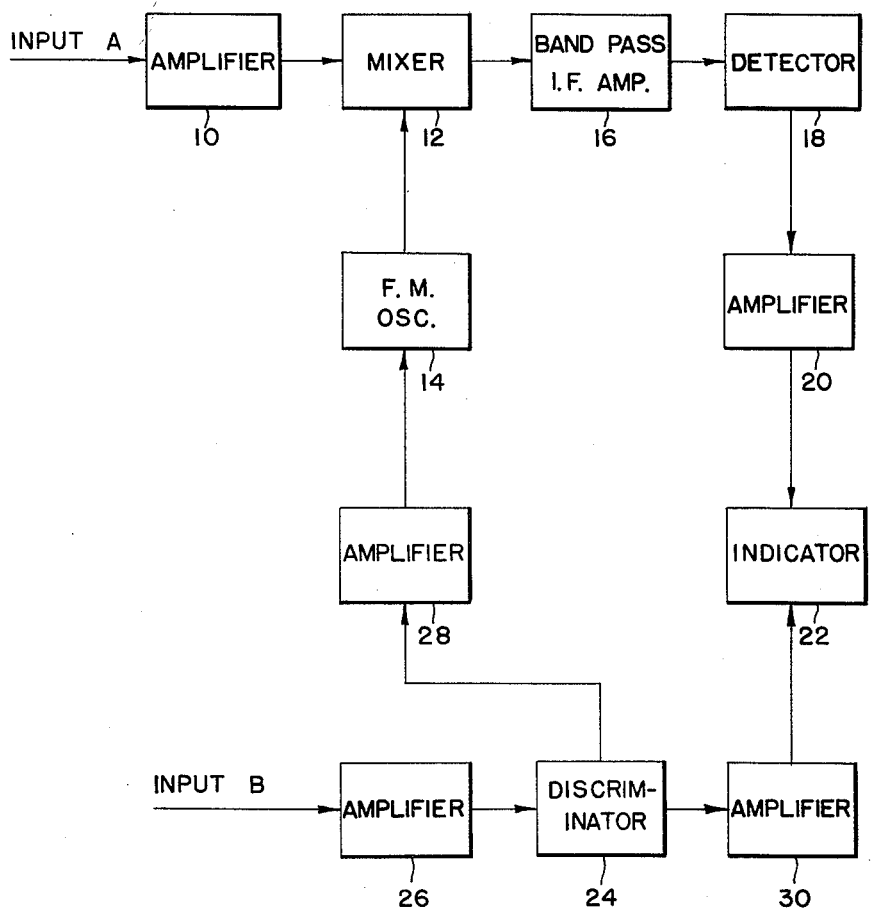
Figure 1 shows schematically a spectrum analyzer.

As has been pointed out hereinabove, the oscillator 14 of Figure 1 is subject to thermal drift and the frequency control circuits may be inherently unstable, thereby causing a drifting of the oscillator frequency away from the required frequency. In order to avoid this difficulty, the embodiment of Figure 3 is preferred because a monitoring means is incorporated for the automatic control of the oscillator.

Oscillator 14 is required to operate at a frequency such that the sideband frequency, resulting from the mixing of the oscillator signal and desired signal (Input A) in mixer 12 is within the pass band of the filter 16, here shown as an I.F. band-pass amplifier. A crystal oscillator 34, operating at a frequency at the center of the pass band of the filter 16, provides a signal which is mixed in mixer 32 with a sample of the signal from oscillator 14 to yield the sideband frequencies $(f_h + f_i)$ and $(f_h - f_i)$, the lower side band frequency corresponding to the desired frequency.

The lower sideband is selected in the filter 38 and then compared to the reference frequency in the frequency comparator circuit 40. This circuit may be of the coincidence detector type in which the output voltage is proportional to the phase difference between the two signals being compared. This phase sensitive voltage is amplified in the A.F.C. amplifier 28 and then applied to the frequency modulated oscillator 14.

As the reference signal is varied in frequency its phase relationship to the comparison signal also varies and the local oscillator 14 will shift in frequency to make up the difference. By this method the two signals will always be maintained at the same frequency.

The advantages of this method are evident in that only the desired signal component is selected and the possibility of drift is eliminated.

Another important advantage is the ability of this system to plot not only amplitude variation of the fundamental as a function of frequency but also harmonics of the fundamental.

This may be done by the insertion of a frequency divider 42 between the filter 38 and the frequency comparator 40 by means of switch 44. If this division is by a factor of two the comparison frequency must at all times be twice the frequency of the reference signal and hence the analyzer frequency must also be twice the reference signal. The harmonic order traced will then be that determined by the division introduced.

In summary, it may be stated that the latter method offers the following advantages over the other methods mentioned. First, the tuning of the analyzer is positive and cannot drift. Second, only the desired component may be analyzed and third this method permits the analysis of harmonic components by simply selecting the proper division ratio.

The various components of the system shown by the blocks in the figures are well known elements and accordingly have not been described herein in detail.

One of the many applications of this type of analyzer is in the field of vibration analysis. One example is the analysis of a high speed blower in which the component of interest is equal in frequency to the rotational speed.

The analyzer is provided with two input connections. The first of these, referred to hereinafter as "Input A," is provided with a complex wave, a component of which, is the desired signal. The second input, referred to hereinafter as "Input B," is provided with a signal voltage derived from the equipment under test and is an indication of the fundamental frequency of the complex waveform, which in this example is the rotational frequency of the blower. The two signal inputs are provided with signal voltages obtained from two transducers mounted on the blower 50. Transducer 52, connected to Input A, is mounted on some member of the blower in which the vibrational resonances are of considerable importance. Transducer 54, connected to Input B, is mounted near the rotating shaft 56. Transducer 54 normally provides a voltage having a waveform approximating a sinusoid at the frequency of rotation. Suitable sensing transducers are well known to the art and need not be described herein.

The signal to be studied (Input A) is filtered out from other signals present, amplified, detected, and applied to control one axis of a two-axis indicator 20. If an oscilloscope is employed as the indicator, this signal may be applied to the "Y-axis" deflection plates.

In like manner the reference frequency signal from transducer 54 (Input B) is amplified and fed through a discriminator 24 to provide a D.C. output voltage which is proportional to the reference or rotation frequency. Deflection amplifier 30 in response to the D.C. reference voltage will produce a corresponding "X-axis" deflection of the oscilloscope if that be the particular type of indicator 22.

While I have fully disclosed, in accordance with the statutes, the best mode of carrying out my invention presently contemplated, I wish it understood that while modifications of the present invention will become apparent to those skilled in the art, it is intended that the present invention be limited solely by the scope of the appended claims.

What is claimed is:

1. In a frequency analyzer, normally provided with a desired signal and a reference signal, the combination comprising: a first amplifier arranged to amplify said desired signal; a first mixer connected in cascade with said first amplifier; a first filter connected in cascade with said first mixer; a detector connected in cascade with said first filter; an indicator under the control of said detector; a second amplifier arranged to amplify said reference signal; a discriminator in cascade connection with said second amplifier and arranged to control said indicator; a crystal controlled oscillator; a second mixer in cascade with said crystal controlled oscillator; a second filter in cascade connection with said second mixer; a frequency comparator arranged to accept and compare signals from said second filter and said second amplifier to produce a control signal indicative of the difference between said second amplifier and second filter signals; a third amplifier arranged to amplify the said control signal from said frequency comparator; a frequency modulated oscillator controlled by the output of said third amplifier and arranged to apply an output signal simultaneously to said first and said second mixers, wherein said frequency modulated oscillator is arranged to operate at a frequency such that the side band frequency produced in the said first mixer is within the normal pass band of said first filter, said crystal controlled oscillator is arranged to operate at a frequency corresponding to the center frequency of said first filter and said second filter is characterized by a pass band frequency corresponding to said desired signal.

2. The apparatus of claim 1 wherein a frequency divider is interposed between said second filter and said frequency comparator.

3. The apparatus of claim 1 wherein said first filter is a band-pass amplifier.

4. In a frequency analyzer, normally provided with a desired signal and a reference signal, the combination comprising: a first amplifier arranged to amplify said desired signal; a first mixer connected in cascade with said first amplifier; a first filter connected in cascade with said first mixer; a detector connected in cascade with said first filter; an indicator under the control of said detector; a second amplifier arranged to amplify said reference signal; a discriminator in cascade connection with said second amplifier and arranged to control said indicator; a fixed frequency oscillator; a second mixer in cascade with said fixed frequency oscillator; a second filter connected in cascade with said second mixer to receive the output thereof and to provide an output signal; a frequency comparator arranged to accept and compare output signals from said second amplifier and said second filter to produce a control signal indicative of the difference in frequency between said second filter and said second amplifier output signals; and a frequency modulated oscillator having a center frequency controlled by said control signal and arranged to apply an output signal simultaneously to said first and said second mixers; wherein said frequency modulated oscillator is arranged to operate at a center frequency such that the side band frequency produced in the said first mixer is within the normal passband frequency of said first filter, said fixed frequency oscillator is arranged to operate at a frequency corresponding to the center frequency of said first filter, and said second filter is characterized by a passband whose center frequency corresponds to said desired signal.

5. The apparatus of claim 4 wherein said indicator is of the type having a first and a second independently controlled axis display, the said first axis display being under the control of said detector and the said second axis display being under the control of said discriminator.

6. In a frequency analyzer, normally provided with a desired signal and a reference signal, the combination comprising a first amplifier arranged to amplify said desired signal; a first mixer connected in cascade with said first amplifier; a first filter connected in cascade with said first mixer; a detector connected in cascade with said first filter; an indicator under the control of said detector; a second amplifier arranged to amplify said reference signal to provide an output signal; a discriminator in cascade connection with said second amplifier and arranged to control said indicator in response to said reference signal; a fixed frequency oscillator; a second mixer in cascade with said fixed frequency oscillator to receive the output of said fixed frequency oscillator to produce an output signal; a frequency comparator arranged to receive a sample of the output signal of said second amplifier; a frequency dividing circuit and a second filter circuit connected in series between said second mixer and said frequency comparator to provide a second sample signal to said comparator, said second sample signal being related in frequency to the frequency of said second mixer output signal whereby the said comparator provides a control signal indicative of the difference in frequency betwen said sample and second sample signals; and a frequency modulated oscillator having a center frequency responsive to said control signal and arranged to apply an output signal simultaneously to said first and said second mixers; wherein said frequency modulated oscillator is arranged to operate at a frequency such that the side band frequency produced in the said first mixer is within the normal pass band of said first filter, said fixed frequency oscillator is arranged to operate at a frequency corresponding to the center frequency of said first filter and said second filter is characterized by a pass band frequency related to said desired signal.

7. In a frequency analyzer, normally provided with a desired signal and a reference signal, the combination comprising: a first amplifier arranged to amplify said desired signal; a first mixer connected in cascade with said first amplifier; a first filter connected in cascade with said first mixer; a detector connected in cascade with said first filter; an indicator under the control of said detector; a second amplifier arranged to amplify said reference signal; a discriminator in cascade connection with said second amplifier and arranged to control said indicator; a fixed frequency oscillator; a second mixer in cascade with said fixed frequency oscillator; a second filter connected in cascade with said second mixer to receive the output thereof and to provide an output signal; a frequency dividing circuit connected in cascade to said second filter to receive the output thereof and to produce an output signal; a frequency comparator arranged to accept and compare output signals from said frequency dividing circuit and said second amplifier to produce a control signal indicative of the difference in frequency between said frequency dividing circuit and said second amplifier output signals; a frequency modulated oscillator having a center frequency controlled by said control signal and arranged to apply an output signal simultaneously to said first and said second mixers; wherein said frequency modulated oscillator is arranged to operate at a frequency such that the side band frequency produced in the said first mixer is within the normal passband frequency of said first filter, said fixed frequency oscillator is arranged to operate at a frequency corresponding to the center frequency of said first filter, and said second filter is characterized by a passband whose center frequency corresponds to said desired signal.

8. In combination: means for detecting vibration present in a rotating machine and producing a vibration signal indicative of the amplitude of said vibration, and means for detecting the rotation of said rotating machine and providing a reference signal having an amplitude proportional to the rotational rate of said machine; two-axis indicating means having a first and a second independently controlled axis display; means for varying the position of the said first axis display responsive to said reference signal; a first variable frequency oscillator providing a first oscillator signal; means arranged to mix said vibration signal with said first oscillator signal to produce sum and difference frequency components; first frequency selective means having a passband passing only one of said sum and difference components; means in cascade connection with said first frequency selective means to provide a second axis display control signal indicative of the amplitude of vibration sensed; means responsive to said second axis control signal controlling said second axis display; a fixed frequency oscillator producing a second oscillator signal; second mixing means for mixing said first and second oscillator signals so as to produce a second mixing means output signal including sum and difference frequency components; second frequency selective means passing said second mixing means output signal components falling within the passband of said first frequency selective means to provide a sample signal; means in cascade with the output of said second frequency selective means arranged to compare the frequency of said sample signal with the frequency of said reference signal to produce a control voltage for varying the first oscillator signal frequency in response to the difference between said reference signal and said sample signal.

References Cited in the file of this patent

UNITED STATES PATENTS

| | | |
|---|---|---|
| 2,361,990 | Brown | Nov. 7, 1944 |
| 2,760,369 | Vanator | Aug. 28, 1956 |